(No Model.)
J. E. FRIST.
VEHICLE WHEEL.
No. 504,573. Patented Sept. 5, 1893.
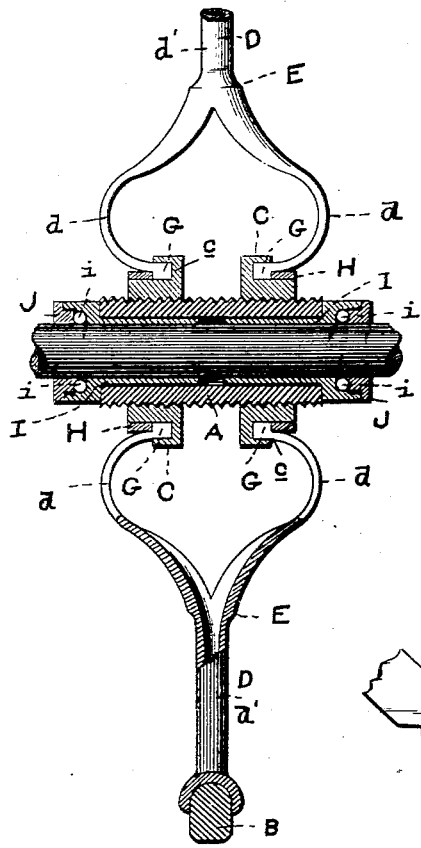
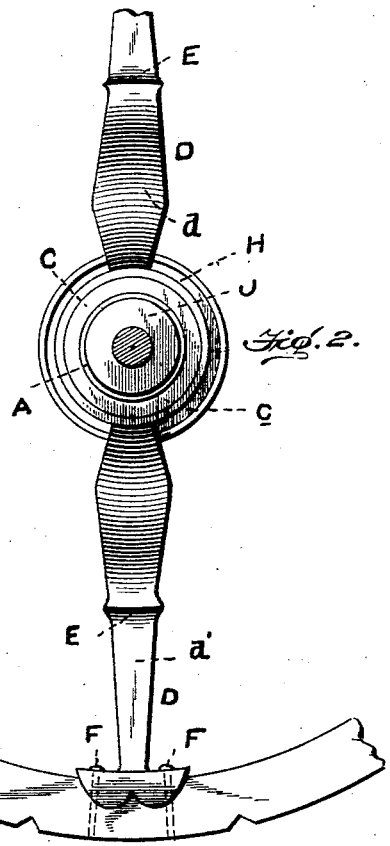
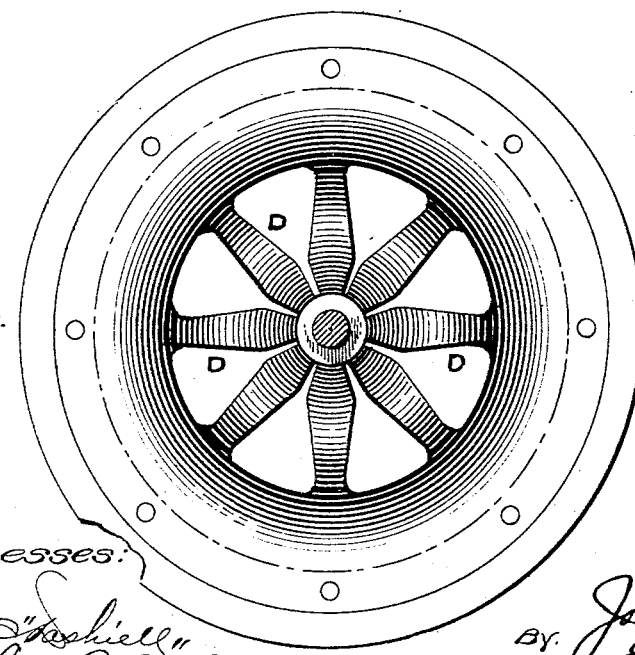
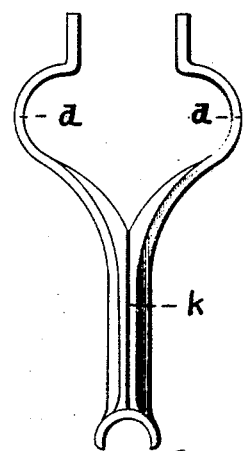
Witnesses:
Wm. T. Tashiell
Arthur L. Bryant
Inventor:
John E. Frist
By Edson Bros.
Att'ys

UNITED STATES PATENT OFFICE.

JOHN E. FRIST, OF BALTIMORE, MARYLAND.

VEHICLE-WHEEL.

SPECIFICATION forming part of Letters Patent No. 504,573, dated September 5, 1893.

Application filed December 7, 1892. Serial No. 454,403. (No model.)

*To all whom it may concern:*

Be it known that I, JOHN E. FRIST, a citizen of the United States, residing at Baltimore, Maryland, have invented certain new and useful Improvements in Vehicle-Wheels; and I do hereby declare the following to be a full, clear, and exact description of the invention, such as will enable others skilled in the art to which it appertains to make and use the same.

My invention relates to improvements in vehicle wheels and the main object of the invention is to provide an elastic wheel which will readily adapt itself to rough or uneven road beds and possess all the advantages of a wheel provided with a pneumatic tire or a wheel mounted on a rubber cushioned axle.

A second object of my invention is to provide means whereby the elasticity of the wheel can be easily regulated.

With these ends in view my invention resides in a wheel consisting of a hub, a rim, and a series of spring metal spokes firmly attached at one end to the rim and having their other ends bifurcated and curved or bowed in opposite directions so that the ends of the divided portion extend parallel to the hub to which they are connected.

My invention further consists in the peculiar construction and arrangement of parts as will be hereinafter more fully pointed out and claimed.

In the accompanying drawings:—Figure 1 is a vertical sectional view through a vehicle wheel constructed in accordance with my invention. Fig. 2 is a side elevation of one of the spokes. Fig. 3 is a view of a modified construction of spoke. Fig. 4 is a side elevation of a truck or car wheel.

Like letters of reference denote corresponding parts in all the figures of the drawings, referring to which—

A designates the hub and B the rim of a vehicle wheel of any desired size and weight. The hub, A, is provided on one side of its middle with a right hand thread and on the opposite side with a left hand thread; on the hub, near the ends thereof, are screwed parallel disks or plates, C, which are provided in their outer faces with annular grooves or recesses $c\,c$ designed to receive the inner divided ends of the spokes, D. The spokes are made of spring metal and are firmly attached at one end to the rim, B, and the inner ends of the spokes are bifurcated to provide two members, $d$, which are bowed or curved outwardly in opposite directions and have their ends inserted in the grooves $c$ formed in the plates, C. The straight portion $d'$ of the spokes may be either tubular or solid as desired and at the beginning of the bifurcation which is the weakest point of the spoke such straight portion is provided with an integral enlarged boss, E.

The fellies composing the rim of the wheel are preferably made U-shaped in cross section and the spokes, D, are attached thereto by having a notch formed in their outer ends which notch receives the rim and the spoke is firmly held in position on the rim by bolts, F. The free ends of the members, $d$ of the spokes are made thicker or larger than the bodies of said members so as to provide shoulders, G, on the outer faces thereof; and said ends are held firmly in place in the grooves $c$ by means of internally threaded collars or locking rings, H, which are screwed on externally threaded hubs formed integral with the disks, C, and bear closely against the shoulders, G, as shown in Fig. 1. By adjusting the disks, C, toward each other on the hub, A, the divided ends of the spokes will be brought closer together and the flexibility of the spokes reduced and the wheel stiffened while by adjusting said disks farther apart the elasticity of the wheel will be increased.

Within the hub, A, are arranged two tubes, I, provided at their opposite outer ends with enlarged heads having ways or grooves, designed to receive a series of friction or bearing balls, $i$, formed in their inner surfaces. Nuts J are screwed on the axle within the enlarged heads of the tubes, I, and serve to confine the balls, $i$, in place. It will thus be seen that I have provided simple means whereby a wheel having a hub of ordinary construction can be readily converted into a ball bearing wheel.

For very light vehicles I may employ a spoke of the form shown in Fig. 3 in which the straight portion, $d'$, is made tubular and strengthened by a series of longitudinal ribs, $k$, and in which the inner bifurcated ends are adapted to fit into sockets formed in the hub.

In Fig. 4 of the drawings I have illustrated a truck or car wheel constructed in accordance with my invention and in which the flexible spokes are stamped out from a single piece of metal forming one side of the wheel, said side plates being suitably attached to an axle or hub and to the rim of the wheel. A wheel made in the form shown in Fig. 4 is specially adapted for heavy hauling.

From the foregoing description and the drawings it will be seen that I have provided a strong and elastic wheel the spokes of which will readily yield and take up any jar occasioned by the wheel striking an obstruction or in passing over a rough road. By drawing the divided ends of spokes toward each other the wheel will be stiffened while by forcing such ends apart the bowed or curved portion will be enlarged and the elasticity or flexibility of the wheel correspondingly increased. The straight portion of the spokes is made strong and all of the spring resides in the bowed or curved portion thereof. It will be noticed that the ends of the spokes extend parallel to the hub and that the pressure is on the outside of the spoke, on the upper side of the curved or bowed portion, and not directly on the end of the spokes. The spokes are capable of considerable lateral as well as vertical movement without being loosened.

I am aware that changes in the form and proportion of parts and detail of construction of the devices herein shown and described as an embodiment of my invention can be made without departing from the spirit or sacrificing the advantages thereof; and I, therefore, reserve the right to make such changes and alterations as fairly fall within the scope of my invention.

Having thus described my improvements, what I claim as new, and desire to secure by Letters Patent, is—

1. A vehicle wheel consisting of a hub, a rim and a series of flexible spokes having their outer ends attached to the rim and their inner ends bifurcated and curved or bowed outwardly and then inwardly to extend parallel to the hub to which they are attached, substantially as described.

2. A vehicle wheel consisting of a hub having parallel disks, provided in their outer faces with annular grooves, secured thereon, a rim and a series of flexible spokes having their outer ends attached to the rim and their inner ends bifurcated and bowed or curved outwardly and then inwardly to extend parallel to the hub and fit in the annular grooves in the outer faces of the parallel disks thereon, substantially as described.

3. A vehicle wheel consisting of a hub, a rim, parallel disks secured on the hub and having annular grooves formed in their outer faces, and a series of spokes having their outer ends attached to the rim and their inner ends bifurcated and bowed outwardly and then inwardly to extend parallel to the hub, the inner ends of the spokes being enlarged and fitted in the grooves in the plates on the hub, substantially as described.

4. A vehicle wheel consisting of a hub, a rim, parallel plates secured on the hub and having annular grooves formed in their outer faces, a series of spokes having their outer ends attached to the rim and their inner ends bifurcated and bowed outwardly and inwardly to extend parallel to the hub, the inner ends of the spokes being enlarged and fitted in the grooves in the disks on the hub, and a locking collar fitted around the hub and bearing against the outer side of the enlarged inner ends of the spokes, substantially as described.

In testimony whereof I affix my signature in presence of two witnesses.

JOHN E. FRIST.

Witnesses:
ARTHUR L. BRYANT,
W. CLARENCE DUVALL.